G. W. GRISWOLD.

Stew-Pans.

No. 136,596.

Patented March 11, 1873.

Witnesses.
John Buckley
Edmund Masson

Inventor:
George W. Griswold,
By Atty A. B. Stoughton.

UNITED STATES PATENT OFFICE.

GEORGE W. GRISWOLD, OF FACTORYVILLE, PENNSYLVANIA.

IMPROVEMENT IN STEW-PANS.

Specification forming part of Letters Patent No. 136,596, dated March 11, 1873.

*To all whom it may concern:*

Be it known that I, GEORGE W. GRISWOLD, of Factoryville, in the county of Wyoming and State of Pennsylvania, have invented a new and useful Improvement in Stew-Pans or Similar Culinary Vessels; and that the following is a full, clear, and exact description of the same, reference being had to the accompanying drawing making a part of this specification, in which—

Figure 1:
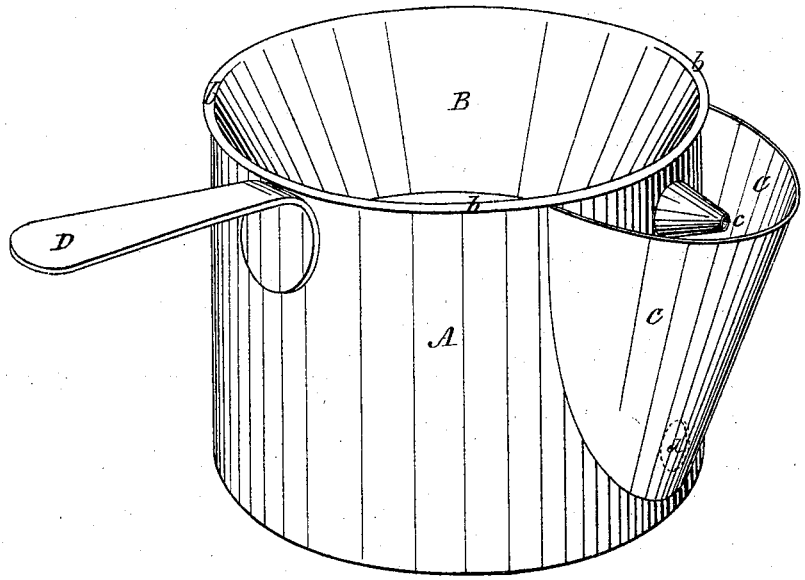
Figure 2:
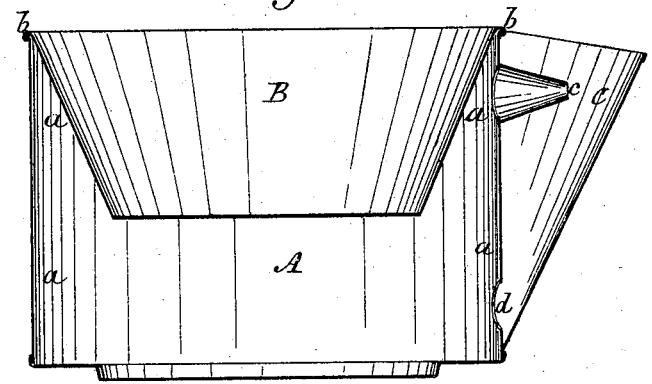

Figure 1 represents the stew-pan in perspective. Fig. 2 represents a section through the same.

I am aware that stew-pans have been made with a water-vessel permanently attached thereto. This I do not claim independent of the construction of the vessel herein described and represented.

My invention consists in a combined stew-pan and water-chamber permanently united into one vessel, in which two openings are made into the water-chamber from the exterior, but both within the lip of the vessel, for the several purposes of easily filling and emptying the water-chamber, and of allowing the steam to escape at or near the top of the water, the water of condensation to run back into the chamber, and to produce circulation of the water therein, and greater facility of generating steam or heat.

To enable others skilled in the art to make and use my invention, I will proceed to describe the same with reference to the drawing.

The exterior vessel A may be made cylindrical, and the interior one, B, conical, so as to leave water or steam space $a$ between said vessels. These two vessels are firmly united by soldering or otherwise at and around their rims $b$, so as to make it, practically, but one vessel or implement. To the outer shell or vessel A there is united a lip, C, and within this lip two openings—viz., an upper one, $c$, and an under one, $d$—are made through said outer shell, so as to reach the water or steam chamber between the two vessels, for a purpose to be hereafter mentioned.

The handle D is so attached that the contents of the inner vessel or stew-pan may be poured out without allowing the water to run out of either of the openings $c\ d$, they being at the highest part or point of the vessel when it is tipped to pour out its contents.

The stew-pan or other culinary vessel may have a lid or cover attached. The lip may have a hinged cover over it in the usual well-known way; and the vessel may be furnished with draw-off cocks, when made large or of great capacity, without in the least changing or altering the characteristics of the culinary vessel in question.

To fill the stew pan or vessel with water the latter is poured into the lip C, which serves as a funnel, and the water runs in at the opening $d$, the air escaping through the upper opening $c$, so that the water will freely flow in.

When the stew-pan is placed over the fire to cook the contents of the inner vessel, without danger of burning or scorching it, the water as it becomes heated, or the steam when it is generated, will run or flow out of the upper opening $c$ into the lip C, and be by it conducted back through the opening $d$ into the vessel again, so that a circulation of the water is kept up, which makes it of more uniform temperature, enables it to more easily go into a state of ebullition, and to throw off steam.

The opening $c$ is made through a nozzle, so that when filling the water-chamber through the lip the water may not pass through said opening $c$.

Having thus fully described my invention, what I claim, and desire to secure by Letters Patent, is—

In combination with a stew-pan or culinary vessel composed of an inner and outer jacket or vessel with water or steam space between them, and with a lip, the upper and under openings $c\ d$ extending from such lip into the water and steam chamber, for the several purposes of filling and emptying said chamber, allowing the steam to escape into said lip, and its water of condensation to flow back into said chamber through the lower opening, permitting circulation of the water, greater uniformity of temperature, and more rapid heat, as described and represented.

G. W. GRISWOLD.

Witnesses:
CHAS. GARDNER,
A. J. GILMORE.